United States Patent
Wijnands et al.

(10) Patent No.: US 7,830,787 B1
(45) Date of Patent: Nov. 9, 2010

(54) FLOODING CONTROL FOR MULTICAST DISTRIBUTION TUNNEL

(75) Inventors: IJsbrand Wijnands, Leuven (BE); Arjen Boers, Sitges (ES); Yiqun Cai, Cupertino, CA (US); Tony Speakman, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1488 days.

(21) Appl. No.: 09/962,958

(22) Filed: Sep. 25, 2001

(51) Int. Cl.
*G01R 31/08* (2006.01)

(52) U.S. Cl. ............. 370/218; 370/229; 370/230.1; 370/234; 370/231; 370/243; 370/358; 370/389; 370/390; 709/223; 709/225

(58) Field of Classification Search ........... 370/229, 370/237, 218; 709/223–226
See application file for complete search history.

(56) References Cited

U.S. PATENT DOCUMENTS

| | | | |
|---|---|---|---|
| 5,325,362 A | 6/1994 | Aziz | 370/405 |
| 6,147,970 A | 11/2000 | Troxel | 370/235 |
| 6,154,463 A * | 11/2000 | Aggarwal et al. | 370/408 |
| 6,185,210 B1 | 2/2001 | Troxel | 370/395.32 |
| 6,269,085 B1 * | 7/2001 | Provino et al. | 370/256 |
| 6,314,105 B1 * | 11/2001 | Luong | 370/395.2 |
| 6,385,647 B1 | 5/2002 | Willis et al. | 709/217 |
| 6,415,323 B1 | 7/2002 | McCanne et al. | 709/225 |
| 6,484,257 B1 | 11/2002 | Ellis | 713/153 |
| 6,498,795 B1 * | 12/2002 | Zhang et al. | 370/400 |
| 6,526,054 B1 * | 2/2003 | Li et al. | 370/390 |
| 6,580,722 B1 | 6/2003 | Perlman | 370/432 |
| 6,584,082 B1 | 6/2003 | Willis et al. | 370/316 |
| 6,633,835 B1 | 10/2003 | Moran et al. | 702/190 |
| 6,654,796 B1 | 11/2003 | Slater et al. | 709/220 |
| 6,678,251 B2 * | 1/2004 | Sowizral et al. | 370/242 |
| 6,687,224 B1 * | 2/2004 | Ater et al. | 370/230 |
| 6,701,361 B1 | 3/2004 | Meier | 709/224 |
| 6,732,189 B1 | 5/2004 | Novaes | 709/249 |
| 6,735,200 B1 | 5/2004 | Novaes | 370/390 |
| 6,791,981 B1 | 9/2004 | Novaes | 370/390 |
| 6,801,502 B1 * | 10/2004 | Rexford et al. | 370/235 |
| 6,801,940 B1 | 10/2004 | Moran et al. | 709/224 |
| 6,804,492 B2 | 10/2004 | Kay | 455/12.1 |
| 6,850,987 B1 * | 2/2005 | McCanne et al. | 709/238 |
| 6,954,790 B2 * | 10/2005 | Forslow | 709/227 |
| 7,230,924 B2 * | 6/2007 | Chiu et al. | 370/237 |
| 7,519,010 B1 * | 4/2009 | Aggarwal et al. | 370/254 |
| 2001/0024443 A1 | 9/2001 | Alriksson et al. | 370/401 |

(Continued)

*Primary Examiner*—Aung S Moe
*Assistant Examiner*—Christopher P Grey
(74) *Attorney, Agent, or Firm*—Campbell Stephenson LLP

(57) ABSTRACT

A multicast transmission scheme is introduced. A multicast data stream is sent on a default tunnel and switched to a data tunnel during flooding conditions. The default tunnel is a point-to-multipoint tunnel from, for example, a source provider edge router to all other provider edge routers in a virtual private network. The data tunnel is a point-to-multipoint tunnel from, for example, a source provider edge router to other provider edge routers that have recipients. Flooding conditions can occur when sending the multicast data stream on the default tunnel, for example, when a specified bandwidth threshold has been exceeded on a source provider edge router. Additionally, the data tunnel is created by selecting a multicast distribution tunnel group from a configured pool of addresses, advertising the group, receiving data joins from, for example, provider edge routers with recipients, and waiting a specified send time.

51 Claims, 7 Drawing Sheets

U.S. PATENT DOCUMENTS

| | | | |
|---|---|---|---|
| 2002/0004843 A1* | 1/2002 | Andersson et al. | 709/238 |
| 2002/0012320 A1 | 1/2002 | Ogier | 370/466 |
| 2002/0023164 A1 | 2/2002 | Lahr | 709/231 |
| 2002/0031107 A1 | 3/2002 | Li et al. | 370/338 |
| 2002/0046287 A1 | 4/2002 | La Porta et al. | 709/230 |
| 2002/0062388 A1 | 5/2002 | Ogier et al. | 709/238 |
| 2002/0075807 A1 | 6/2002 | Troxel et al. | 370/238 |
| 2002/0075866 A1 | 6/2002 | Troxel et al. | 370/389 |
| 2002/0078127 A1 | 6/2002 | Troxel | 709/201 |
| 2002/0078238 A1 | 6/2002 | Troxel et al. | 709/245 |
| 2002/0085498 A1 | 7/2002 | Nakamichi et al. | 370/239 |
| 2002/0116529 A1* | 8/2002 | Hayden | 709/245 |
| 2002/0147011 A1 | 10/2002 | Kay | 455/427 |
| 2002/0172155 A1 | 11/2002 | Kasvand-Harris et al. | 370/229 |
| 2002/0184368 A1 | 12/2002 | Wang | 709/226 |
| 2003/0037109 A1 | 2/2003 | Newman et al. | 709/201 |
| 2003/0051048 A1 | 3/2003 | Watson et al. | 709/238 |
| 2003/0053457 A1 | 3/2003 | Fox et al. | 370/390 |
| 2003/0063608 A1 | 4/2003 | Moonen | 370/390 |
| 2003/0067928 A1 | 4/2003 | Gonda | 370/401 |
| 2003/0074584 A1 | 4/2003 | Ellis | 703/201 |
| 2003/0105865 A1 | 6/2003 | McCanne et al. | 709/223 |
| 2003/0110288 A1 | 6/2003 | Ramanujan et al. | 709/238 |
| 2003/0147405 A1 | 8/2003 | Khill | 370/401 |
| 2003/0152063 A1 | 8/2003 | Giese et al. | 370/349 |
| 2003/0165140 A1 | 9/2003 | Tang et al. | 370/393 |
| 2003/0172145 A1 | 9/2003 | Nguyen | 709/223 |
| 2003/0174706 A1 | 9/2003 | Shankar et al. | 370/393 |
| 2003/0179742 A1 | 9/2003 | Ogier et al. | 370/351 |
| 2003/0200307 A1 | 10/2003 | Raju et al. | 709/224 |
| 2003/0212821 A1 | 11/2003 | Gillies et al. | 709/238 |
| 2004/0025018 A1 | 2/2004 | Haas et al. | 713/168 |
| 2004/0037279 A1 | 2/2004 | Zelig et al. | 370/390 |
| 2004/0054799 A1 | 3/2004 | Meier et al. | 709/230 |
| 2004/0062267 A1 | 4/2004 | Minami et al. | 370/463 |
| 2004/0090919 A1* | 5/2004 | Callon et al. | 370/237 |
| 2004/0103282 A1 | 5/2004 | Meier et al. | 713/171 |
| 2004/0133619 A1 | 7/2004 | Zelig | 709/200 |
| 2004/0165600 A1 | 8/2004 | Lee | 370/395.53 |
| 2004/0205215 A1 | 10/2004 | Kouvelas et al. | 709/231 |

* cited by examiner

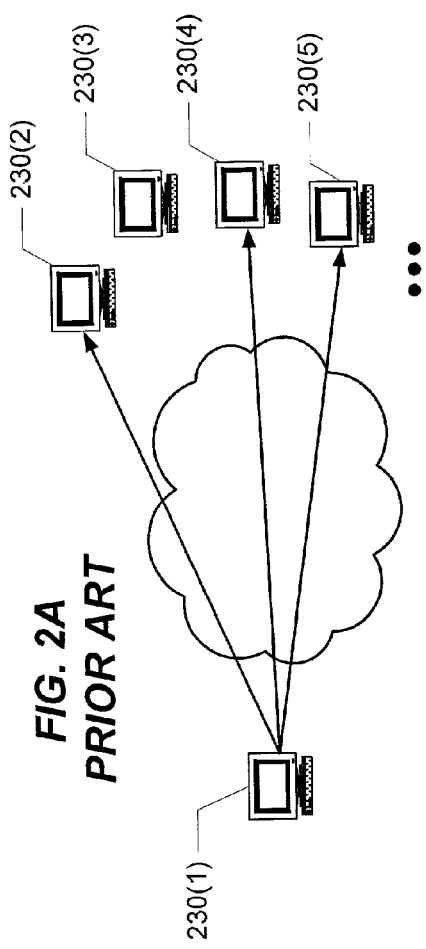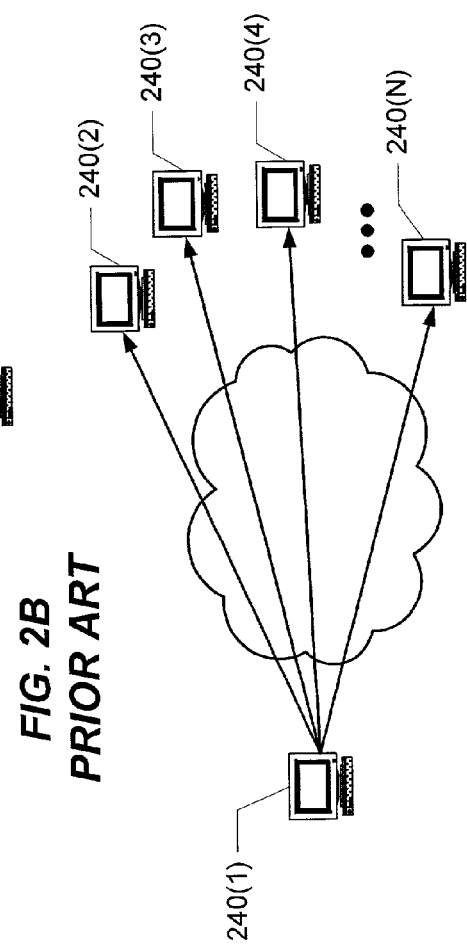
FIG. 2A PRIOR ART
FIG. 2B PRIOR ART

FLOODING CONTROL FOR MULTICAST DISTRIBUTION TUNNEL

BACKGROUND OF THE INVENTION

1. Field of the Invention

The present invention relates to the field of multicast transmission and more particularly the use of tunneling.

2. Description of the Related Art

Many emerging Internet applications transmit data one-to-many or many-to-many, where one or multiple sources are sending to multiple recipients. Examples of these applications include corporate messaging applications for disseminating a message to multiple employees, stock applications for continually sending stock prices to brokers, and video and audio conferencing applications for remote meetings and telecommuting. One-to-many and many-to-many transmission can be efficiently implemented using the Internet Protocol (IP) Multicast transmission scheme in which sources send a single copy of a message to a group of multiple recipients. Multicast transmission is more efficient than requiring the source to send an individual copy of a message to each recipient (referred to as unicast transmission). In unicast transmission, the number of recipients is limited by the bandwidth available to the source. Multicast transmission is also more efficient than having a source broadcast one copy of the message to all nodes on the network (referred to as broadcast transmission), because many nodes may not want the message, and because broadcasts are often limited to a single sub-network.

In multicast transmission, recipients join a particular multicast session group and traffic is delivered to all members of that group by the network infrastructure. The source does not need to maintain a list of recipients. Ideally, only one copy of a multicast message passes over any link in the network, and copies of the message are made only where paths diverge at a router.

Service provider backbones often use tunneling to make multicast transmission workable and scalable over Virtual Private Networks (VPNs). A VPN includes a number of sites that have IP connectivity over a common backbone. One important feature of a VPN, in particular a MPLS VPN, is that the VPN doesn't require these sites be owned and managed by the same enterprise. Likewise, there is no restriction on the autonomy of the backbone. The service provider backbone can be operated by a single service provider or made up of several interconnecting networks independently managed by different providers. Tunneling typically involves encapsulating multicast datagrams in a standard unicast datagram and transmitting the encapsulated multicast datagram (referred to as a multicast VPN "MVPN" packet), between provider edge routers. Using unicast tunnels does not provide a scalable solution because the unicast tunnels have to be built between customer edge (CE) routers in a full mesh. A VPN with 100 sites would require 99 tunnels on every CE router.

An alternate method builds multipoint tunnels where the destination address of the tunnel datagram is a multicast address. The multicast multipoint tunnels encapsulate MVPN multicast packets. Tunneling makes multicast transmission scalable by reducing the number of multicast routing states required in provider routers. However, when MVPN packets are forwarded using a multicast multipoint tunnel to other provider edge routers, every router connected to that tunnel receives a copy of the MVPN packet, even though there may not be any interested recipients behind that provider edge router. The provider edge router that is not interested in the MVPN packets has to process and drop the packets, which wastes processing resources and bandwidth. Because a tunnel does not have any knowledge of the packets the tunnel is forwarding, there is no way to prune the multicast distribution tree if a provider edge is not interested in the content. The provider edge gets flooded with unwanted packets that must be discarded.

Using multicast multipoint tunneling across VPNs reduces the number of multicast routing states in provider routers, but increases the usage of bandwidth and the amount of processing required of provider edge routers. As multicast applications become more common and applications transmit larger amounts of data, a scalable solution balancing the number of multicast routing states and the amount of bandwidth used is needed.

SUMMARY OF THE INVENTION

In accordance with the present invention, a multicast transmission scheme is introduced. A multicast data stream is sent on a default multicast distribution tunnel, referred to as a default tunnel, and is switched to a data multicast distribution tunnel, referred to as a data tunnel, during flooding conditions. The default tunnel is a point-to-multipoint tunnel from, for example, a source provider edge router to all other provider edge routers in a service provider backbone. The data tunnel is a point-to-multipoint tunnel from, for example, a source provider edge router to other provider edge routers that have recipients. Flooding conditions can occur when sending the multicast data stream on the default tunnel, for example, when a specified bandwidth threshold has been exceeded on a source provider edge router.

According to one embodiment of the present invention, the data tunnel is created by selecting a multicast distribution tunnel group from a configured pool of addresses, advertising the group, receiving Protocol Independent Multicast Protocol (PIM) joins from, for example, provider edge routers with recipients, and waiting a specified send time to start forwarding on the data tunnel. The specified send time is configured to allow interested provider edge routers to join the data tunnel before the multicast data steam is sent on the data tunnel.

According to another embodiment of the present invention, advertising of the data tunnel group address is performed according to the Multicast Distribution Tunnel Protocol. (MDTP).

According to another embodiment of the present invention, the multicast data stream is switched back to the default tunnel if both a specified bandwidth threshold is not exceeded and the time since the multicast data steam was switched to the data tunnel has exceeded a specified wait time.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIGS. 2A-2C, prior art, illustrate exemplary transmission methods.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention that is defined in the claims following the description.

INTRODUCTION

According to the present invention, multicast distribution tunnels (MDTs) are dynamically created based on exceeded bandwidth of customer multicast virtual private network (MVPN) traffic. A multicast data stream is initially forwarded across a service provider backbone using a default tunnel (referred to herein as an MDT-default tunnel). The MDT-default tunnel defines a path from a source provider edge router (that is, a provider edge router connected to the source of the multicast data stream) to all other provider edge routers within the VPN. The multicast data stream is encapsulated at the service provider edge router and forwarded on the MDT-default tunnel. Thus, all other provider edge routers within the VPN receive the multicast data steam even if there are no recipients (that is, customer sites desiring to receive the multicast data stream) connected to the provider edge router.

The service provider edge router monitors the multicast data stream for a specified bandwidth threshold. If the specified bandwidth threshold is exceeded, the service provider edge router creates a new tunnel (referred to herein as an MDT-data tunnel). The MDT-data tunnel is a path from the source provider edge router to only other provider edge routers within the VPN that have joined the MDT-data tunnel. Provider edge routers join the MDT-data tunnel by sending joins according to the Protocol Independent Multicast Protocol (PIM) to the MDT-data tunnel group address. The multicast data stream is switched to the MDT-data tunnel, relieving provider edge routers without recipients from unwanted packets. Thus, dedicated MDTs are built that forward high-bandwidth traffic across the service provider backbone. Because of the dedicated MDT, a provider edge router with interested recipients can join and leave the MDT channel at any time. Ideally, the high-bandwidth multicast data streams are assigned to dedicated MDT channels while the low-bandwidth streams use the same default MDT.

According to embodiments of the present invention, a trade-off between the number of routing states created in provider routers and more efficient multicast data stream forwarding in the backbone is made, providing flexibility in network design.

Example Networking Environment

Figure 1:
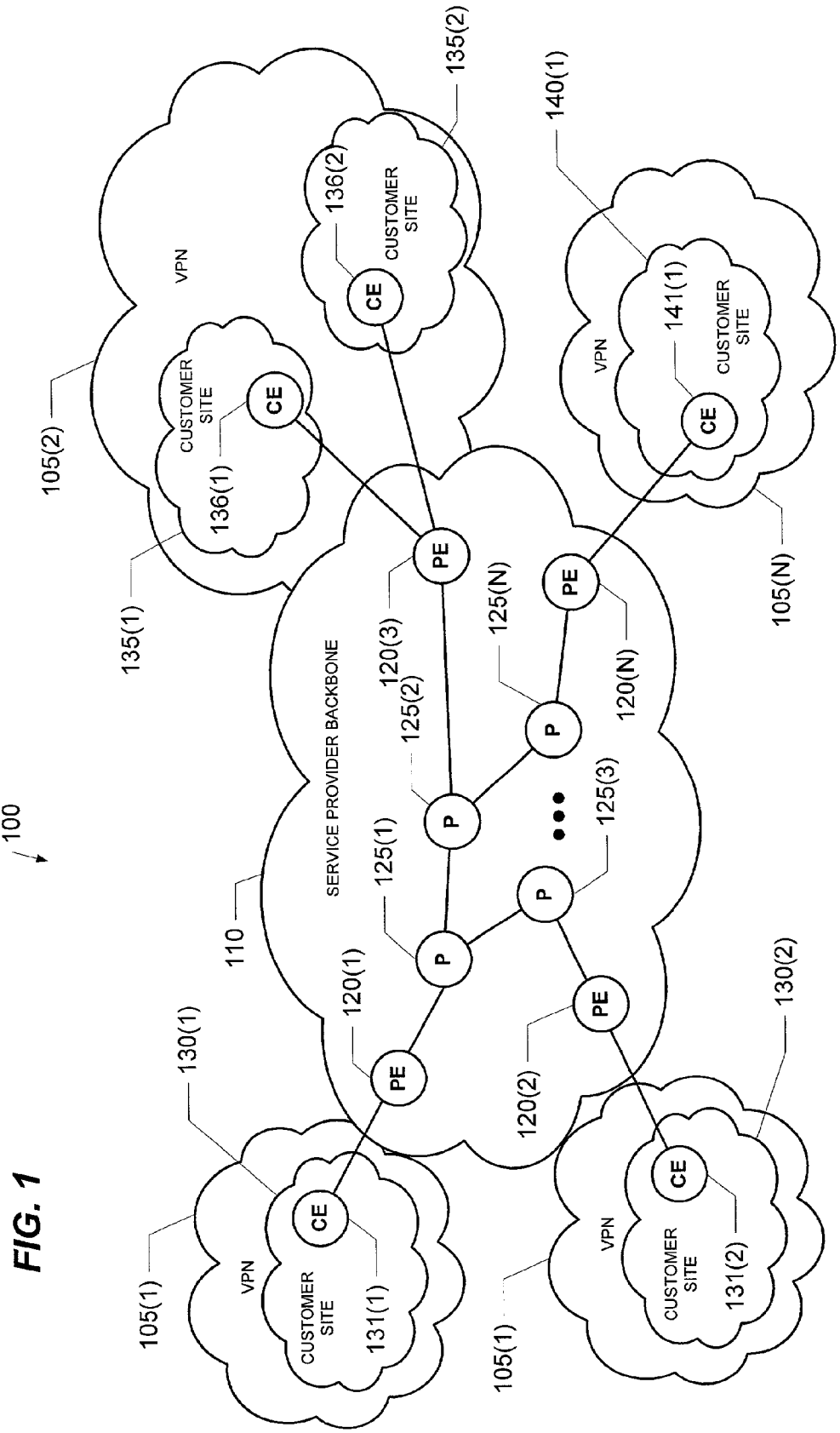
FIG. 1 illustrates an exemplary network environment with multiple virtual private networks (VPNs) and a service provider backbone in which embodiments of the present invention can be practiced.

FIG. 1 illustrates an exemplary network environment 100 with multiple virtual private networks (VPNs) 105(1)-(N) and a service provider backbone 110 in which embodiments of the present invention can be practiced. Service provider backbone 110 includes provider edge (PE) routers 120(1)-(N) and provider (P) routers 125(1)-(N). VPN 105(1) includes customer sites 130(1)-(2). Each of customer sites 130(1)-(2) contains customer devices (not shown) attached to customer edge (CE) routers 131(1)-(2), respectively. VPN 105(2) includes customer sites 135(1)-(2) and contains customer devices (not shown) attached to customer edge routers 136(1)-(2), respectively.

It will be noted that the variable identifier "N" is used in several instances in FIG. 1 and other figures to more simply designate the final element (e.g., VPN 105(N), provider edge router 125(N), and so on) of a series of related or similar elements (e.g., VPNs 105(1)-(N), provider edge routers 125(1)-(N), and so on). The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" can hold the same or a different value than other instances of the same variable identifier. For example, VPN 105(N) may be the ninth VPN in a series of VPNs, whereas provider edge router 125(N) may be the forty-sixth provider edge router in a series of provider edge routers.

Even though not directly connected, customer sites 130(1)-(2) communicate and exchange information utilizing service provider backbone 110. In addition, even though not directly connected, customer sites 135(1)-(2) communicate and exchange information utilizing service provider backbone 110. Only the provider edge routers directly connected to the VPNs are aware of the VPNs. Packets exchanged between customer sites can be sent using multiple transmission schemes, including unicast, broadcast, and multicast transmission.

FIG. 2A illustrates a unicast transmission scheme. Unicast transmission generates a separate copy of a data packet for each recipient. Customer device 230(1) sends a copy of a packet to each of customer devices 230(2)-(N) that desire to receive the packet. Unicast transmission is simple to implement but difficult to scale if the number of customer devices 230(2)-(N) that desire to receive the packet is large. Unicast transmission also requires extra bandwidth, because the same information has to be carried multiple times, even on shared links.

FIG. 2B illustrates a broadcast transmission scheme. Broadcast transmission forwards a data packet to all portions of a network, wasting bandwidth when there are few intended recipients. Customer device 240(1) sends one copy of each packet to each of customer devices 240(2)-(N) by addressing the packet to a broadcast address. Due to the simpler addressing scheme, broadcast transmission is simpler to implement than unicast transmission, but is more difficult to route, especially over a wide area. Networks either stop broadcasts at, for example, the LAN boundary to prevent broadcast storms or send the broadcast everywhere causing a significant burden on network resources if only a few users want to receive the packets. Broadcast packets are processed by each of customer devices 240(2)-(N), even those not interested in the data, which places a burden on those customer devices.

Figure 2C:
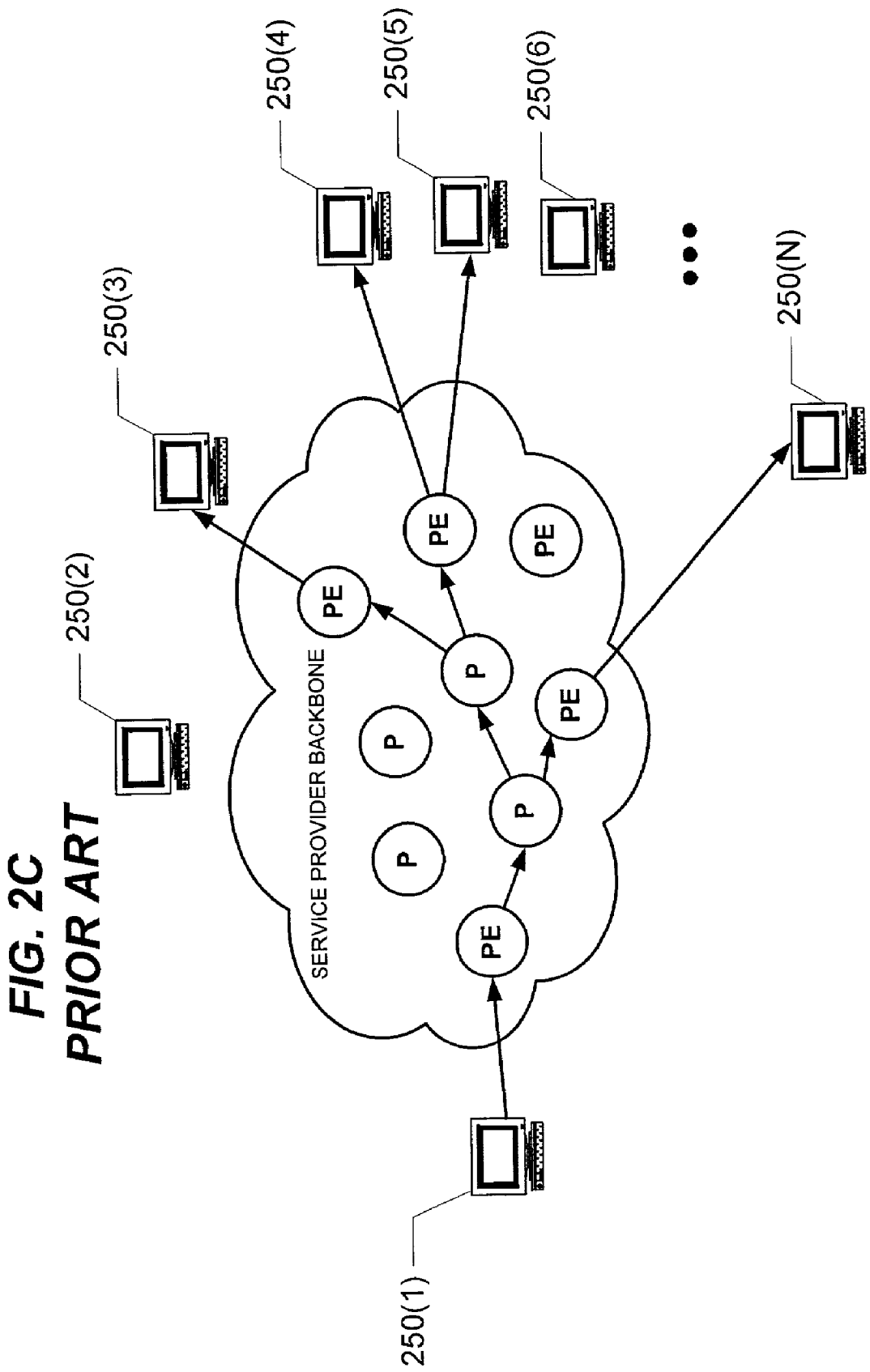

FIG. 2C illustrates a multicast transmission scheme. Multicast transmission sends a single multicast packet addressed with a multicast address to all intended recipients. Customer device 250(1) sends a single copy of a packet that is received by each of customer devices 250(2)-(N) that wants to receive the packet. As illustrated, multiple copies of the packet are generated only where paths diverge at a router. A multicast address is used to communicate with a group of recipients rather than a single recipient. Multicast addresses specify an arbitrary group of customer devices that have joined the group and wish to receive traffic sent to this group. Customer devices that are interested in receiving data flowing to a particular group must join the group using, for example, Internet Group Multicast Protocol (IGMP). Customer devices must be a member of the group to receive the multicast data stream.

The group of customer devices 250(2)-(N) that want to receive the packet can be located anywhere on the Internet and do not have any physical or geographical boundaries. Multicast transmission depends on the network to forward the packets to only those networks and customer devices that need to receive them, therefore controlling network traffic and reducing the amount of processing that hosts have to do. Multicast transmission provides efficient communication and transmission.

PIM Multicast Trees

Figure 3A:
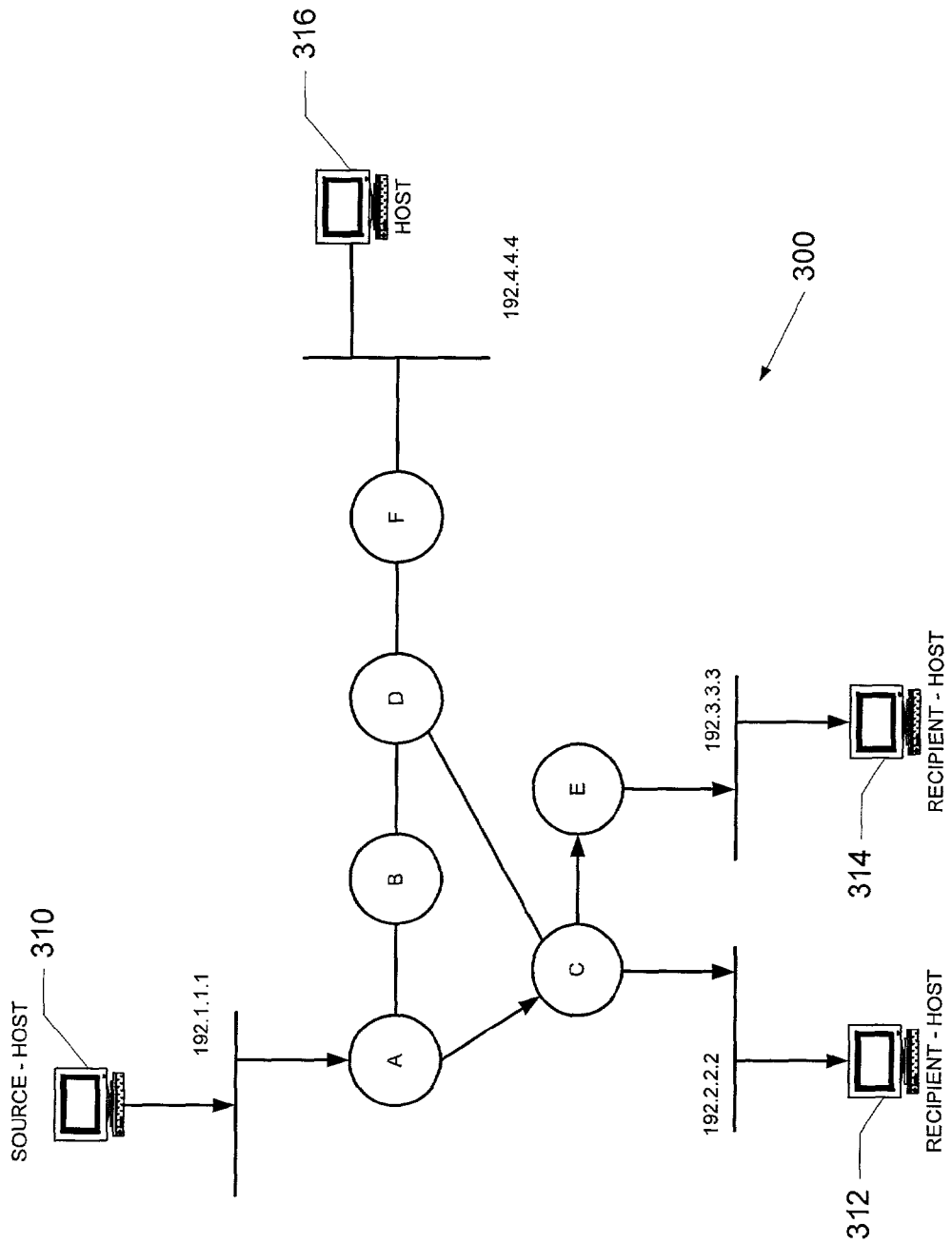
FIGS. 3A-3B, prior art, illustrate exemplary multicast distribution trees as described in the PIM protocol specification.
Figure 3B:
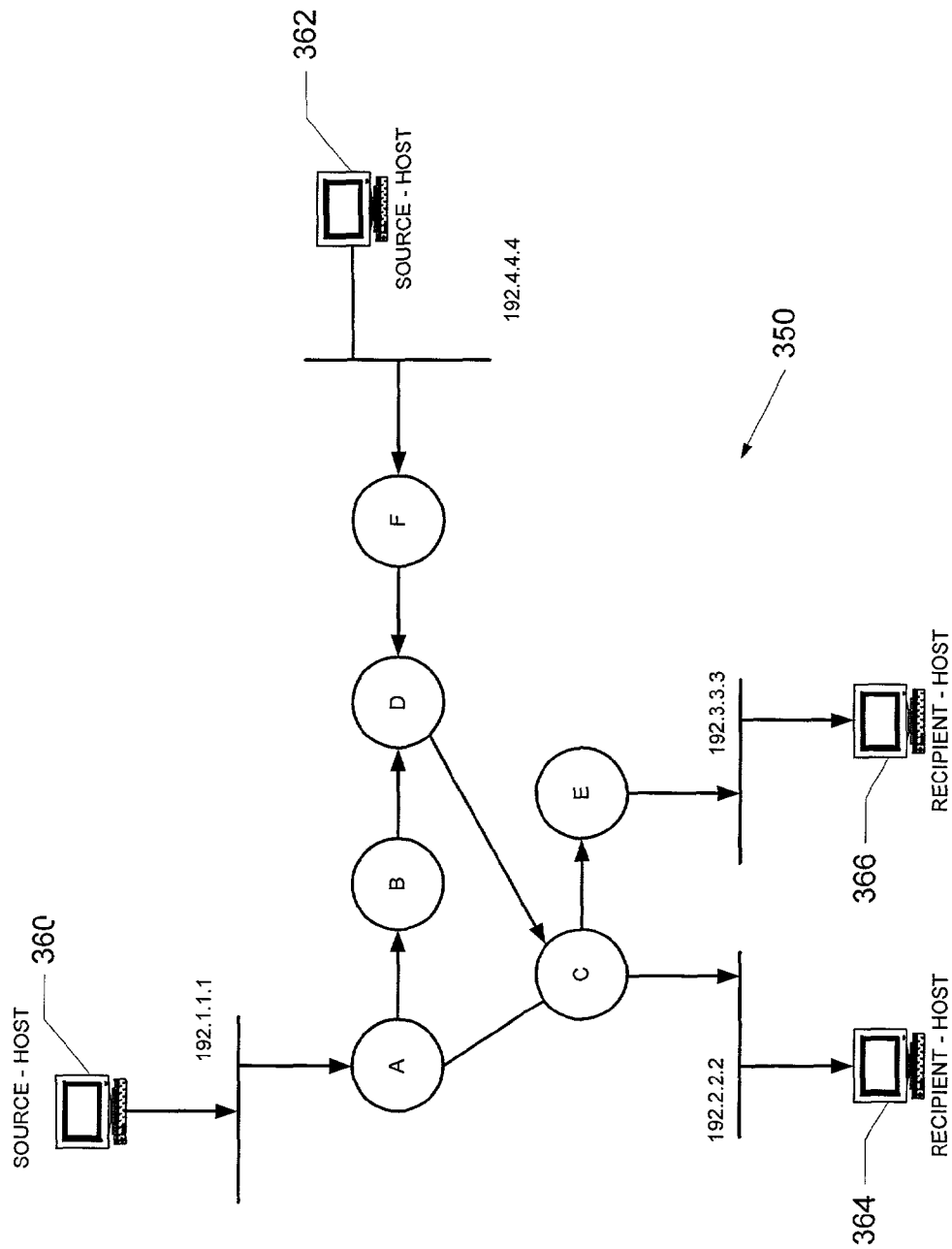

FIGS. 3A-3B illustrate Multicast forwarding trees as described in the PIM protocol specification. Multicast capable routers create distribution trees that control the path which multicast traffic takes through the network in order to deliver traffic to all recipients. The two basic types of multicast distribution trees are source trees and shared trees.

FIG. 3A illustrates an example of a source tree 300. Source tree 300 has a root at a source host 310, and branches forming a spanning tree through the network to recipient hosts 312 and 314. The network includes routers A, B, C, D, E, and F. Because source tree 300 uses the shortest path through the network through routers A, B and D, it is also referred to as a shortest path tree (SPT). The special notation of (S,G), pronounced "S comma G", enumerates a source tree where S is the IP address of the source and G is the multicast group address. "192.1.1.1" is the IP address of source host 310. "224.1.1.1" is the multicast group address for source tree 300. Using this notation, source tree 300 is identified by (192.1.1.1, 224.1.1.1). A separate source tree exists for each individual source sending to each group. For example, if Host 312 is also sending traffic to group 224.1.1.1 and Hosts 310 and 314 are recipients, then a separate (S,G) source tree would exist with a notation of (192.2.2.2, 224.1.1.1).

FIG. 3B illustrates a shared tree 350. Unlike source trees that have their root at the source, shared trees use a single common root, referred to as a Rendezvous Point (RP), placed at some chosen point in the network. The network includes routers A, B, C, D, E, and F and hosts 360, 362, 364, and 366. Router D is designated the RP. When using shared tree 350, sources, such as host 360 and host 362, must send traffic to router D and then the traffic is forwarded down shared tree 350 to reach all recipients (e.g., host 364 and host 366). Because all sources in a multicast group use a common shared tree, a wildcard notation (written as (*, G), pronounced "star comma G") represents the shared tree. In this case, * means all sources, and G represents the multicast group address 224.2.2.2. Therefore, shared tree 350 is identified by (*, 224.2.2.2).

As multicast transmission prescribes, both source and shared multicast distribution trees are loop-free. Messages are replicated only where the tree branches.

Members of multicast groups can join or leave at any time, therefore the distribution trees are dynamically updated. When all the active recipients on a particular branch stop requesting the traffic for a particular multicast group, the routers prune that branch from the distribution tree and stop forwarding traffic down that branch. If one recipient on that branch becomes active and requests the multicast traffic, the router dynamically modifies the distribution tree and starts forwarding traffic again.

Source trees have the advantage of creating the optimal path between the source and the recipients, guaranteeing the minimum amount of network latency for forwarding multicast traffic. However, the routers must maintain path information for each source increasing the number of routing states in the provider routers. In a network that has thousands of sources and thousands of groups, resources on the routers and memory consumption from the size of the multicast routing table must be factored into the network design.

Shared trees have the advantage of requiring the minimum amount of routing states in each router. The overall memory requirements are lower for a network that only allows shared trees. However, under certain circumstances, the paths between the source and recipients might not be the optimal paths, causing some latency in packet delivery.

The networks described in FIGS. 2A-2C and FIGS. 3A-3B are simplified for ease of illustration. Networks can includes hundreds of VPNs, customer sites, provider edge routers, and provider routers. A service provider backbone can be operated by a single service provider or made up of several interconnecting networks independently managed by different providers. Forwarding and routing packets across a VPN is a complicated process, especially when the service provider backbone is made up of several interconnecting networks managed by different providers. In a multicast enabled VPN (MVPN), a multicast forwarding tree can span multiple sites. Sources and recipients may be located in different sites. These sites are usually managed by a single administrative entity such as in the case of a private enterprise network, but can also be administered by different enterprise networks. Packet routing across a VPN is described in the sections below.

Unicast/Broadcast Packet Routing Across a VPN

To implement unicast and broadcast routing across service provider backbone 110, each of VPNs 105(1)-(N) is associated with one or more VPN routing/forwarding instances (VRFs). A VRF defines the VPN membership of a customer site attached to a provider edge router. For example, customer edge router 130(1) in VPN 105(1) is attached to provider edge router 120(1). A VRF includes an IP routing table, a forwarding table, a set of interfaces that use the forwarding table, and a set of rules and routing protocol parameters that control the information that is included into the routing table. A one-to-one relationship does not necessarily exist between customer sites and VPNs. A given site can be a member of multiple VPNs. However, a site can only associate with one (and only one) VRF. A customer site's VRF contains all the routes available to the site from the VPNs of which it is a member.

Packet forwarding information is stored in the IP routing table and the forwarding table for each VRF. A separate set of routing and forwarding tables is maintained for each VRF. These tables prevent information from being forwarded outside a VPN, and also prevent packets that are outside a VPN from being forwarded to a router within the VPN.

Based on routing information stored in the VRF IP routing table and VRF forwarding table, packets are forwarded to their destination using, for example, Multi Protocol Label Switching (MPLS). A provider edge router, for example, provider edge router 120(1), binds a label to each customer prefix learned from a customer edge router, for example customer edge router 131(1), and includes the label in the network reach-ability information for the prefix that is advertised to other provider edge routers, for example provider edge routers 120(2)-(N). When provider edge router 120(1) forwards a packet received from customer edge router 131(1) across service provider backbone 110, the packet is labeled with the label learned from the destination provider edge router, for example, provider edge router 120(3). When provider edge router 120(3) receives the labeled packet, provider edge router 120(3) uses the label to direct the packet to the correct customer edge router, for example, customer edge router 136(1). Label forwarding across service provider backbone 110 is based, for example, on either dynamic label switching or traffic engineered paths. A customer data packet carries two levels of labels when traversing service provider backbone 110: a top label directs the packet to the correct provider edge router and a second label indicates how that provider edge router should forward the packet to the customer edge router.

Multicast Routing over a VPN

To implement multicast routing across a VPN within a service provider backbone, tunnels are typically used. Each VRF on a provider edge router has its own multicast routing and forwarding table referred to as a Multicast VPN routing/forwarding instance (MVRF). When a multicast packet is received from a particular customer edge router, for example, customer edge router 131(1), multicast routing is performed utilizing the associated MVRF.

Protocol Independent Multicast (PIM) is a common multicast protocol used with VPNs. Each of provider edge routers 120(1)-(N) runs several instances of PIM, as many as one PIM per VRF for which multicast routing is enabled. Multicast routing entries created by each PIM instance is specific to the corresponding MVRF. In each instance of PIM, a provider edge router establishes two types of adjacency: one between the provider edge router and each of the PIM-capable customer edge routers associated with that MVRF, and the other between the provider edge router and a subset of other provider edge routers. The second type of PIM adjacency is created and maintained over a special interface called a multicast tunnel interface that is used to transport multicast traffic across the service provider backbone.

Among all the instances of PIM, there is a special PIM instance called the "global" PIM instance. A provider edge router must run the global instance of PIM if there is at least one other MVRF created. In the global PIM instance, a provider edge router keeps PIM adjacency with each of its PIM-capable Interior Gateway Protocol (IGP) neighbors in the global VRF (i.e., with provider routers), but NOT with any customer edge routers, or other provider edge routers (unless they happen to be adjacent in the service provider backbone).

MVRFs form multicast domains (MDs). A multicast domain is a set of MVRFs that are connected to the potential (but possibly inactive) sources and recipients via customer edge interfaces. More than one multicast domain can be created. The collection of multicast domains builds a virtual backbone on top of the service provider backbone. The virtual backbone is used for providing multicast connectivity only. An MVRF becomes part of a multicast domain via user configuration. The MVRF can be associated to more than one multicast domain and is based on the location of the content source and the routing policy.

MVPN Service Models

Multicast connectivity is established based on unicast reach-ability by means of reverse path forwarding (RPF) check. Depending on unicast addressing and reach-ability, three MVPN service models are derived.

In the first model, referred to as an Intranet, all sites are owned and operated by the same enterprise network. In an Intranet, multicast content is not delivered beyond the boundary of the enterprise network. Since the enterprise owns all the sites and thus all the systems in these sites, both sources and recipients are free to use private addresses. Intranet services are provided by assigning a default multicast domain to every MVRF. Normally, all of the MVRFs connected to the sites of the same enterprise are assigned to the same default domain. If a service provider provides MVPN services to more than one enterprise, the default multicast domains do not overlap with each other to ensure traffic separation among private networks.

In the second model, referred to as an Extranet, multicast sources and recipients are independently owned and managed by more than one enterprise. Multicast content is distributed among these enterprises, but not beyond. Through some private agreement, the participating parties leak routes to the multicast sources into each other's IGP domains using, for example, Multicast Border Gateway Protocol (MBGP) or some other mechanism. This allows recipients in different enterprises to join the multicast distribution trees rooted in another enterprise. The Extranet model permits both sources and recipients to use private addresses, as long as all the routes to the sources are reachable and without ambiguity. Extranet services are provided by connecting an MVRF to recipients interested in traffic sourced from within other enterprises. Therefore, the MVRF may be assigned to one or more additional multicast domains. Typically, the additional multicast domains are ones that include the MVRFs connected to the sources. In practice, an administrator may assign as few as two multicast domains to an MVRF connected to the sources. One (the default multicast domain) is used to send multicast traffic within the enterprise, the other is used to send content outside the enterprise.

The third model addresses the case of native multicast access to the Internet. In this model, the source addresses must be globally reachable. While the sources must have globally routable prefixes, recipients do not require unique prefixes. All the recipients can belong to one enterprise or span multiple enterprise networks. To provide native multicast services to the Internet, the service provider can create a separate domain to which all the MVRFs interested in Internet content can connect. The most significant advantage of this approach is that the multicast content needs to transit the service provider network only once. However, if an enterprise deploys firewall and places the firewall behind a single customer edge router, the content may still go through the service provider network multiple times: once into the MVRF connected to the firewall and then redistributed in the default multicast domain of the enterprise.

Multicast Tunneling

Inter-domain services are most often supported across the Internet using a tunneling mechanism. A multicast distribution tunnel (MDT) is a point-to-multipoint, unidirectional tunnel established in the service provider backbone between provider edge routers to make multicast in MPLS-VPNs scalable. The root and leaves of the MDT tunnel are provider edge routers with MVRFs assigned to the same multicast domain.

Using MDTs to connect VPNs in the service provider backbone is efficient due to the minimal amount of routing states created in the provider routers in the service provider backbone. Only one MDT group is typically needed per VPN. The number of routing states created depends on the PIM protocol used for the MDT group. When shared trees are used, only one (*,G) state is generated in the provider routers. When source trees are used, one (S,G) state for every provider edge router participating in the MVPN is generated.

Each multicast domain is assigned a distinct group address from a pool that is administered by the service provider(s). The group ranges reserved for multicast domains are referred to as MDT groups. MDT groups are used to encapsulate and transport VPN traffic within the corresponding multicast domain. Multicast routing states for MDT groups are created and maintained in the global MVRF only. To a provider router, an MDT group appears the same as any other multicast address and does not require any special handling for routing and forwarding. A provider edge router encapsulates the VPN packets entering multicast domains and decapsulates the packets exiting the domains.

When a provider edge router sends a packet to a multicast domain, the provider edge router typically adds either a Generic Routing Encapsulation-Internet Protocol (GRE-IP) or an IP-IP header to the original packet header. The source address of the outer IP header is a unicast address that is the BGP local peering address of the VRF. The destination address is the MDT group address assigned to the domain. The resulting packet is then routed in the global MVRF. When a packet is received from a multicast domain, the provider edge router removes the GRE-IP (or IP-IP) encapsulation and then continues to route the packet in the target MVRF identified by the MDT group address in the outer header.

For every multicast domain that an MVRF is part of, the provider edge router creates a special interface called a multicast tunnel interface. A multicast tunnel interface is an interface the MVRF uses to access the multicast domain. The multicast tunnel interface can be thought of as a conduit that connects an MVRF and the global MVRF. Provider edge routers exchange PIM Hello packets via the interface to establish PIM adjacency with other provider edge routers in the same multicast domain. Provider edge routers also send PIM control packets to build multicast forwarding trees spanning multiple customer sites. During a forwarding procedure, multicast tunnel interfaces are used to do a RPF (reverse path forwarding) check on packets received from the service provider backbone. When a provider edge router sends a packet out to a multicast tunnel interface, the provider edge router is actually sending the packet to the multicast tunnel rooted locally. Conversely, when a provider edge router receives a packet from a multicast tunnel interface, the provider edge router is receiving the packet from one of the multicast tunnels for which the provider edge router is a leaf.

Flooding Control Architecture and Processing (Optimized Tunneling)

Because every provider edge router in a multicast domain joins the multicast tunnel rooted at every other provider edge router, whenever a provider edge router sends a packet to the multicast tunnel, all of the leaf provider edge routers receive the packet. While this is necessary for provider edge routers to receive PIM control packets from each other, it is more desirable to reduce the flooding behavior if the payload packets are unwanted by some of the provider edge routers. Thus, packets forwarded via the MDT tunnel are received by all provider edge routers participating in the VPN, including provider edge routers that do not have recipients. These provider edge routers are flooded with unwanted packets that must be dropped.

MDT-Default Tunnel and MDT-Data Tunnel

According to the present invention, two types of MDTs are used: an MDT-default tunnel and an MDT-data tunnel. The MDT-default tunnel is a user-configured MDT group used for forwarding MVPN multicast data and PIM control traffic. Here, an MDT group refers to the multicast group address that is used to build the multicast forwarding tree which is used to forward the actual tunnel packets. Initially, all MVPN multicast data is sent to the MDT-default tunnel. The multicast forwarding tree that has been built in the provider network is used to distribute the tunnel packets to provider edge routers. Here, a tree is a collection of forwarding states on a router, i.e., the path from a source to one or more receivers is called a forwarding tree. The MDT-default tunnel is used to build the PIM adjacencies with the provider edge routers participating in the MVPN. PIM control traffic is always sent via the MDT-default tunnel. If flooding of other provider edge routers is not a problem, no further action is needed. If recipients are densely populated between the provider edge sites, flooding is typically not an issue.

For sparsely-populated high-bandwidth groups, flooding of provider edge routers is minimized by using MDT-data tunnels. The MDT-data is a tunnel that is created on demand for specific MVPN groups. A multicast data stream that is initially forwarded on the MDT-default tunnel can be moved to an MDT-data tunnel to minimize flooding of other provider edge routers in the same multicast domain. The MDT-data group is dynamically chosen from a configured pool of addresses.

The MDT-data tunnels are built on demand by PE routers. The MDT-data tunnels are multipoint tunnels where the outer destination is a multicast IP address. The outer destination IP address defines the MVPN the MDT tunnel belongs to and the MVPN (S,G) for which it has been created. The number of MDT-data tunnels that can be created is controlled by the provider, which typically should only create an MDT-data tunnel for high rate sources. The provider can configure a pool of MDT-data group addresses per MVPN that can be used to build the MDT-data tunnels. When a new MDT-data tunnel needs to be created, a group address is obtained from the MVPN pool.

According to the present invention, MDT-data tunnels are created dynamically for specific multicast data streams that exceed a specified bandwidth threshold. The specified bandwidth threshold is configured and monitored on the provider edge router that is connected to the MVPN source. When the specified bandwidth threshold is exceeded, the multicast data stream is associated with a different MDT group in the service provider backbone, i.e., the MDT-data tunnel. Multicast groups used to create MDT-data forwarding trees are chosen from a pool of configured addresses. The size of the pool can be different for each VPN. By limiting the size of the pool, the maximum amount of routing states that are created in the provider routers can be controlled. If a large MDT-data pool is used, more optimal forwarding of data in the service provider backbone is provided, but the creation of more states is incurred.

When a provider edge router creates an MDT-data tunnel for a MVPN multicast stream, the provider edge router chooses the multicast group that is used for the MDT-data tunnel. The MVPN multicast stream is encapsulated using this group. Provider edge routers that have recipients for the group need to join the group to receive the data. The receiving provider edge routers have no control on what group is chosen.

MDT-Data Advertisements

When a MVPN multicast stream exceeds the specified bandwidth threshold, the provider edge router selects an MDT-group from the pool and advertises the new MDT group (S,G,MDT) mapping to all provider edge routers in that MVPN. In the notation (S,G,MDT), "S,G" is the multicast stream from the MVPN that is identified my a source and group address, MDT is the MDT-data multicast group address used to setup the MDT-data forwarding tree in the provider network for this "S,G". A MDT-data tunnel is created by a PE router for a specific (S,G) that is in the MVPN. Other PE routers that have local interest in the (S,G) MVPN need to know the MDT-data group address that has been selected by the PE router that is doing the switch over. PE routers that have local interest in the (S,G) from this MVPN need to join the MDT-data group address.

Provider edge routers that have recipients for "S,G" immediately join the MDT group. The type of join depends on the PIM mode the MDT-group is in. This can be Source Specific Multicast, Bi-directional or normal Sparse-mode PIM join. After the source provider edge router sends the MDT-data advertisement, the source provider edge router waits a specified send time, for example three seconds, before sending the multicast data stream to the MDT-data tunnel. Thus, recipients are allowed to first build the MDT-data forwarding tree, which prevents loss of data during the switchover from the MDT-default tunnel.

When the MVPN multicast stream goes below the threshold, the MDT-data advertisements are no longer sent and the data will eventually be forwarded using the MDT-default tunnel. The switch to the MDT-default tunnel can occur immediately because every provider edge router is joined to the MDT-default group by default. However, the switch to the MDT-default tunnel occurs only after a specified wait time (for example, one minute from when the MDT-data tunnel was created) to prevent "flapping" between the two. The switch is controlled by the PE router that is connected to the source in the MVPN. The PE router monitors the traffic rate. If the traffic rate exceeds the configured limit, a MDT-data tunnel is created and the source PE router starts using the MDT-data tunnel to forward the MVPN multicast packets instead of the MDT-default tunnel. If the traffic rate goes below the configured limit, the source PE router switches the MVPN multicast packets back to the default tunnel.

Provider edge routers that do not have recipients cache the join information to minimize join latency. The (S,G,MDT) joins are sent periodically, for example, every minute, hence, the cached (S,G,MDT) mappings time-out after, for example, three minutes if not refreshed.

MDT-Data Pool

The amount of groups available for creating MDT-data tunnels is limited by system configuration constraints. Typically, an MDT-data tunnel is not created for every MVPN stream, which would create a great amount of routing states in the service provider backbone. If more MVPN multicast streams exceed the specified bandwidth threshold than there are MDT-data group addresses in the pool, addresses are re-used from the pool. The re-use is based on a reference count or more complex parameters and policies. Re-use of an address from the pool is often more favorable than returning to the use of the MDT-default tunnel.

One embodiment of the present invention uses a reference count to determine the re-use of MDT-data pool addresses. When an address is picked from the pool, the reference count for the MDT-data group is increased by one. When there is a need to create a new MDT-data tunnel, a group from the pool with the lowest reference count is obtained. This ensures that the MVPN (S,G) are evenly distributed across the MDT-data groups. This is a simple model that has good forwarding characteristics.

Another embodiment of the present invention uses accumulated MVPN traffic rate information to determine the re-use of MDT-data pool addresses. Here, the MDT-data group address that has the lowest accumulated traffic rate from the MVPN (S,G) that are tunneled through the MDT-data tunnel is re-used. This policy ensures that all MDT-data tunnels have approximately the same traffic rate in the provider backbone.

Another embodiment of the present invention uses a HASH algorithm to determine the re-use of MDT-data pool addresses. To make the mapping between the MVPN (S,G) and the MDT-data group address predictable and very simple, a HASH value is defined and used to select the MDT-data pool address. The HASH defines how many and which bits from the MVPN group are mapped into the MDT-data group. For example a HASH 0.0.0.255, and a MDT-data pool of 239.1.1.0/24 would map MVPN group 224. 1.1.15 into 239.1.1.5.

Another embodiment of the present invention uses the MDT-data tunnel structure to determine the re-use of MDT-data pool addresses. An efficient way to re-use MDT-data tunnels is to keep track of which PE routers have joined a specific MDT-data tunnel. If there are MVPN (S,G)'s that have the same PE routers as receivers, the MDT-data tunnel can be shared without causing additional flooding of PE routers with no receivers.

Figure 4A:
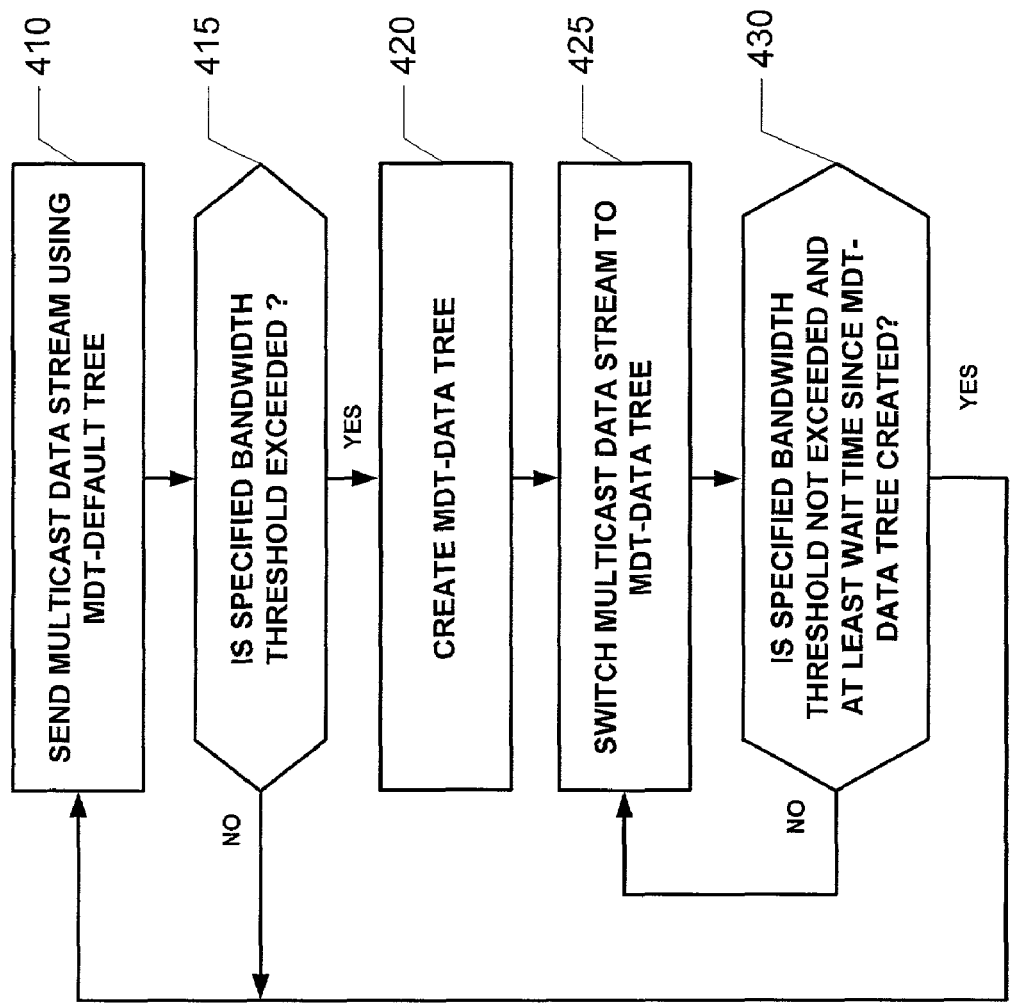
FIGS. 4A-4B illustrate flow diagrams of multicast transmission across a VPN according to embodiments of the present invention.

FIG. 4A illustrates a flow diagram of a transmission of a multicast data stream according to embodiments of the present invention. Initially, and under normal operating conditions, a multicast data stream is sent to provider edge routers using an MDT-default tunnel, step 410. The MDT-default tunnel defines a path from a source provider edge router (that is, a provider edge router connected to the source of the multicast data stream) to all other provider edge routers within the VPN. The multicast data stream is encapsulated at the source provider edge router and forwarded on the MDT-default tunnel. A specified bandwidth threshold is monitored on the provider edge router connected to the MVPN source, step 415. The bandwidth of the multicast data stream is compared to the specified bandwidth threshold. If the bandwidth threshold is not exceeded, normal operation continues with sending the multicast data stream using the MDT-default tunnel, step 410. If the bandwidth threshold is exceeded, an MDT-data tunnel is created, step 420. The MDT-data multicast forwarding tree is a path from the service provider edge router to only other provider edge routers within the VPN that have joined the MDT-data group. The creation of the MDT-data tunnel is further described in FIG. 4B. After the MDT-data tunnel is created, the multicast data stream is switched to the newly created MDT-data tunnel, step 425. The specified bandwidth threshold continues to be monitored as well as the time since the MDT-data tunnel was created, step 430. If either the specified bandwidth threshold continues to be exceeded or the time since the MDT-data tunnel was created has not exceeded a specified wait time, the multicast data stream continues to be sent on the MDT-data tunnel, step 425. If both the specified bandwidth threshold is not exceeded and the time since the MDT-data tunnel was created has exceeded a specified wait time, the multicast data stream is switched back to the MDT-default tunnel, step 410.

Figure 4B:
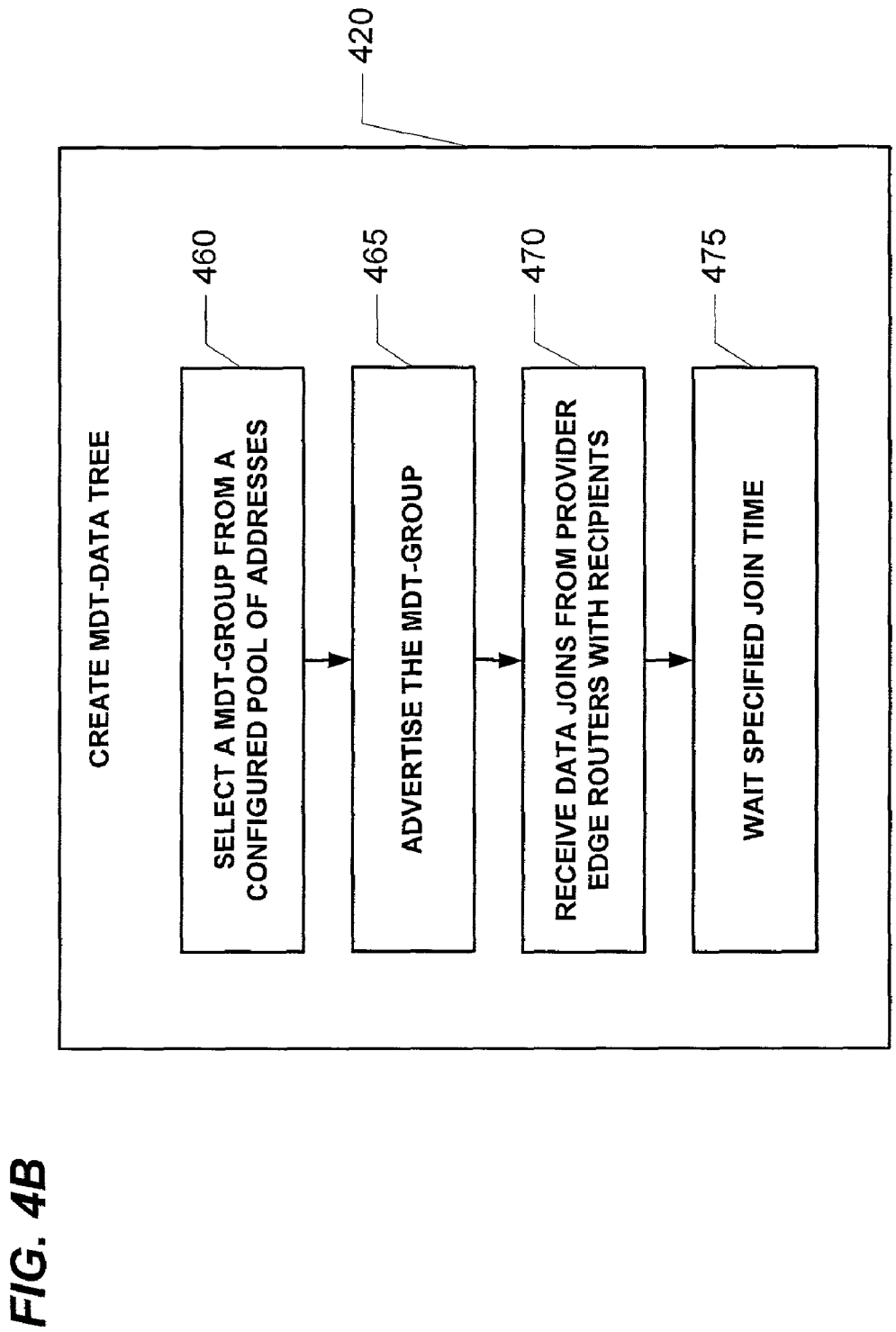

FIG. 4B illustrates a flow diagram of the process of creating an MDT-data tunnel according the embodiments of the present invention. When a MVPN multicast data stream exceeds the specified bandwidth threshold, the service provider edge router selects an MDT-group from the configured pool of addresses, step 460. The service provider edge router advertises the new MDT group (S,G,MDT) mapping to all provider edge routers in that MVPN, step 465. Joins for the MDT-data group are received from provider edge routers with recipients using, for example, PIM (protocol Independent Multicast), step 470. The service provider edge router waits for a period of time (referred to as a specified send time) to ensure that receiving PE routers have joined the MDT-data group prior to switching the data to the MDT-data tunnel, step 475. Thus, recipients are allowed to first build the MDT-data forwarding tree, which prevents loss of data during the switchover from the MDT-default tunnel.

FIGS. 4A-4B illustrate flow diagrams of multicast transmission according to embodiments of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof-encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiment are for illustration only. Operations may be combined or the functionality of the operations may be distributed in additional operations in accordance with the invention.

Other embodiments are within the following claims. Also, while particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for multicast transmission comprising:
   sending a multicast data stream on a multicast distribution tunnel (MDT)-default tunnel, wherein
      the MDT-default tunnel is a point-to-multipoint tunnel from a source provider edge router to a first plurality of provider edge routers, and
      the MDT-default tunnel transmits an additional multicast data stream other than the multicast data stream;
   detecting that the multicast data stream has exceeded a specified bandwidth;
   switching the multicast data stream to an MDT-data tunnel in response to the detecting wherein
      the MDT-data tunnel is a point-to-multipoint tunnel from the source provider edge router to a second plurality of provider edge routers,
      said second plurality is a proper subset of said first plurality when the switch occurs,
      each of said second plurality of provider edge routers joins a group in response to the group being advertised by the source provider edge router prior to said switching,
      said MDT-data tunnel transmits only the multicast data stream, and
      said switching comprises
         stopping transmission of the multicast data stream via the MDT-default tunnel, and
         subsequent to said stopping, beginning transmission of the multicast data stream via the MDT-data tunnel; and
   switching the multicast data stream back to the MDT-default tunnel if both said flooding conditions cease and the time since the multicast data stream was switched to the MDT-data tunnel has exceeded a specified wait time.

2. The method as recited in claim 1, wherein the source provider edge router and the first plurality of provider edge routers are contained in a virtual private network.

3. The method as recited in claim 1, wherein the some but not all of the first plurality of provider edge routers, are coupled to respective recipients of the multicast data stream.

4. The method as recited in claim 1, further comprising:
   creating the MDT-data tunnel.

5. The method as recited in claim 4, wherein creating the MDT-data tunnel comprises:
   selecting an MDT group from a configured pool of addresses;
   advertising the MDT group;
   waiting a specified send time.

6. The method as recited in claim 5, wherein the specified send time is configured to allow receipt of MDT group advertisements before the multicast data stream is sent on the MDT-data tunnel.

7. The method as recited in claim 5, wherein the advertising the MDT group is performed according to the Multicast Distribution Tunnel (MDT) Protocol.

8. The method as recited in claim 5, further comprising:
   if there are no un-selected MDT groups in the configured pool of addresses, re-using an address from the configured pool of addresses.

9. The method as recited in claim 8, wherein the re-using is based on a reference count and a MDT group with a lowest reference count is selected.

10. The method as recited in claim 8, wherein the re-using is based on accumulated traffic rate information and a MDT group with a lowest accumulated traffic rate is selected.

11. The method as recited in claim 8, wherein the re-using is based on a HASH algorithm.

12. The method as recited in claim 8, wherein the re-using uses a MDT data tunnel structure approach comprising:
    tracking which provider edge routers have joined a specific MDT group; and
    sharing the MDT group with an MVPN group that has the same provider edge routers as receivers.

13. The method as recited in claim 12, wherein the specified wait time is configured to decrease the occurrence of flapping between the MDT-default tunnel and the MDT-data tunnel.

14. An apparatus for multicast transmission comprising:
    a device configured to send a multicast data stream on a multicast distribution tunnel (MDT)-default tunnel, wherein
        the MDT-default tunnel is a point-to-multipoint tunnel from a source provider edge router to a first plurality of provider edge routers, and
        the MDT-default tunnel transmits an additional multicast data stream other than the multicast data stream;
    a device configured to detect that the multicast data stream has exceeded a specified bandwidth;
    a device configured to switch the multicast data stream to an MDT-data tunnel in response to the detecting, wherein
        the MDT-data tunnel is a point-to-multipoint tunnel from the source provider edge router to a second plurality of provider edge routers,
        said second plurality is a proper subset of said first plurality when the switch occurs,
        each of said second plurality of provider edge routers joins a group in response to the group being advertised by the source provider edge router prior to said switching,
        said MDT-data tunnel transmits only the multicast data stream, and
        said switching comprises
            stopping transmission of the multicast data stream via the MDT-default tunnel, and
            subsequent to said stopping, beginning transmission of the multicast data stream via the MDT-data tunnel; and
    device configured to switch the multicast data stream back to the MDT-default tunnel if both said flooding conditions cease and the time since the multicast data stream was switched to the MDT-data tunnel has exceeded a specified wait time.

15. The apparatus as recited in claim 14 wherein the source provider edge router and the first plurality of provider edge routers are contained in a virtual private network.

16. The apparatus as recited in claim 14, wherein the some but not all of the first plurality of provider edge routers, are coupled to respective recipients of the multicast data stream.

17. The apparatus as recited in claim 14, further comprising:
    a device configured to create the MDT-data tunnel.

18. The apparatus as recited in claim 17, wherein the device configured to create the MDT-data tunnel is configured to:
    select an MDT group from a configured pool of addresses;
    advertise the MDT group; and
    wait a specified send time.

19. The apparatus as recited in claim 18, wherein the specified send time is configured to allow receipt of MDT group advertisements before the multicast data stream is sent on the MDT-data tunnel.

20. The apparatus as recited in claim 18, wherein the device configured to create the MDT-data tunnel is configured to advertise the MDT group according to the Multicast Distribution Tunnel (MDT) Protocol.

21. The apparatus as recited in claim 18, further comprising:
    a device configured to re-use an address from the configured pool of addresses if there are no un-selected MDT groups in the configured pool of addresses.

22. The apparatus as recited in claim 21, wherein the re-using is based on a reference count and a MDT group with a lowest reference count is selected.

23. The apparatus as recited in claim 21, wherein the re-using is based on accumulated traffic rate information and a MDT group with a lowest accumulated traffic rate is selected.

24. The apparatus as recited in claim 21, wherein the re-using is based on a HASH algorithm.

25. The apparatus as recited in claim 21, wherein the re-using uses a MDT data tunnel structure approach comprising:
    tracking which provider edge routers have joined a specific MDT group; and
    sharing the MDT group with an MVPN group that has the same provider edge routers as receivers.

26. The apparatus as recited in claim 25, wherein the specified wait time is configured to decrease the occurrence of flapping between the MDT-default tunnel and the MDT-data tunnel.

27. An apparatus for multicast transmission comprising:
    a non-transitory computer readable medium; and
    instructions stored on the non-transitory computer readable medium to:
        send a multicast data stream on a multicast distribution tunnel (MDT)-default tunnel, wherein the MDT-default tunnel is a point-to-multipoint tunnel from a source provider edge router to a first plurality of provider edge routers, and
        the MDT-default tunnel is configured to transmit an additional multicast data stream other than the multicast data stream;
        detect that the multicast data stream has exceeded a specified bandwidth;
        switch the multicast data stream to an MDT-data tunnel in response to the detecting, wherein the MDT-data tunnel is a point-to-multipoint tunnel from the source provider edge router to a second of the plurality of provider edge routers,
        said second plurality is a proper subset of said first plurality when the switch occurs,
        each of said second plurality of provider edge routers is configured to join a group in response to the group being advertised by the source provider edge router prior to said switching,
        said MDT-data tunnel is configured to transmit only the multicast data stream, and
        said switch comprises stopping transmission of the multicast data stream via the MDT-default tunnel, and subsequent to said stopping, beginning transmission of the multicast data stream via the MDT-data tunnel; and
        switch the multicast data stream back to the MDT-default tunnel if both said flooding conditions cease and the time since the multicast data stream was switched to the MDT-data tunnel has exceeded a specified wait time.

28. The apparatus as recited in claim 27, wherein the source provider edge router and the first plurality of provider edge routers are contained in a virtual private network.

29. The apparatus as recited in claim 27, wherein the some but not all of the first plurality of provider edge routers, are coupled to respective recipients of the multicast data stream.

30. The apparatus as recited in claim 27, the instructions further comprising instructions to:
create the MDT-data tunnel.

31. The apparatus as recited in claim 30, wherein to create the MDT-data tunnel the instructions are configured to:
select an MDT group from a configured pool of addresses;
advertise the MDT group; and
wait a specified send time.

32. The apparatus as recited in claim 31, wherein the specified send time is configured to allow receipt of MDT group advertisements before the multicast data stream is sent on the MDT-data tunnel.

33. The apparatus as recited in claim 31, wherein to advertise the MDT group is performed according to the Multicast Distribution Tunnel (MDT) Protocol.

34. The apparatus as recited in claim 31, further comprising instructions to:
re-use an address from the configured pool of addresses if there are no un-selected MDT groups in the configured pool of addresses.

35. The apparatus as recited in claim 34, wherein the instructions to re-use utilizes a reference count wherein a MDT group with a lowest reference count is selected.

36. The apparatus as recited in claim 34, wherein the instructions to re-use utilize accumulated traffic rate information and a MDT group with a lowest accumulated traffic rate is selected.

37. The apparatus as recited in claim 34, wherein the instructions to re-use utilizes a HASH algorithm.

38. The apparatus as recited in claim 34, wherein the instructions to re-use uses a MDT data tunnel structure approach comprising instructions to:
track which provider edge routers have joined a specific MDT group; and
share the MDT group with an MVPN group that has the same provider edge routers as receivers.

39. The apparatus as recited in claim 38, wherein the specified wait time is configured to decrease the occurrence of flapping between the MDT-default tunnel and the MDT-data tunnel.

40. An apparatus for multicast transmission comprising:
a source provider edge router configured to:
send a multicast data stream on a multicast distribution tunnel (MDT)-default tunnel, wherein
the MDT-default tunnel is a point-to-multipoint tunnel from a source provider edge router to a first plurality of provider edge routers, and
the MDT-default tunnel is configured to transmit an additional multicast data stream other than the multicast data stream;
monitor a specified bandwidth threshold,
if the specified bandwidth threshold is exceeded, create a MDT-data tunnel and send the multicast data stream on the MDT-data tunnel, wherein
the MDT-data tunnel is a point-to-multipoint tunnel from the source provider edge router to a second plurality of provider edge routers,
said second plurality is a proper subset of said first plurality when the multicast data stream is first sent on the MDT-data tunnel,
each of said second plurality of provider edge routers joins a group in response to the group being advertised by the source provider edge router prior to said switching,
said MDT-data tunnel transmits only the multicast data stream, and
said sending the multicast data stream on the MDT-data tunnel comprises
stopping transmission of the multicast data stream via the MDT-default tunnel, and
subsequent to said stopping, beginning transmission of the multicast data stream via the MDT-data tunnel; and
switch the multicast data stream back to the MDT-default tunnel if both said flooding conditions cease and the time since the multicast data stream was switched to the MDT-data tunnel has exceeded a specified wait time.

41. The apparatus as recited in claim 40, wherein the source provider edge router and the first plurality of provider edge routers are contained in a virtual private network.

42. The apparatus as recited in claim 40, wherein the some but not all of the first plurality of provider edge routers, are coupled to respective recipients of the multicast data stream.

43. The apparatus as recited in claim 40, wherein to create the MDT-data tunnel, the source provider edge router is configured to:
select an MDT group from a configured pool of addresses;
advertise the MDT group; and
wait a specified send time.

44. The apparatus as recited in claim 43, wherein the specified send time is configured to allow receipt of MDT group advertisements before the multicast data stream is sent on the MDT-data tunnel.

45. The apparatus as recited in claim 43, wherein to advertise the MDT group is performed according to the Multicast Distribution Tunnel (MDT) Protocol.

46. The apparatus as recited in claim 43, wherein the source provider edge router is further configured to:
re-use an address from the configured pool of addresses if there are no un-selected MDT groups in the configured pool of addresses.

47. The apparatus as recited in claim 46, wherein to re-use is based on a reference count and a MDT group with a lowest reference count is selected.

48. The apparatus as recited in claim 46, wherein to re-use is based on accumulated traffic rate information and a MDT group with a lowest accumulated traffic rate is selected.

49. The apparatus as recited in claim 46, wherein to re-use is based on a HASH algorithm.

50. The apparatus as recited in claim 46, wherein to re-use is based on a MDT data tunnel structure approach wherein the source provider edge router is configured to:
track which provider edge routers have joined a specific MDT group; and
share the MDT group with an MVPN group that has the same provider edge routers as receivers.

51. The apparatus as recited in claim 40, wherein
the specified wait time is configured to decrease the occurrence of flapping between the MDT-default tunnel and the MDT-data tunnel.

* * * * *